United States Patent [19]

Suitch et al.

[11] Patent Number: 5,137,574

[45] Date of Patent: * Aug. 11, 1992

[54] METHOD FOR PRODUCING HIGH OPACIFYING KAOLIN PIGMENT

[75] Inventors: Paul Suitch, Milledgeville; Ralph E. Turner, Jr., Tennille; Dona L. Archer; William B. Smith, both of Sandersville, all of Ga.

[73] Assignee: ECC America Inc., Atlanta, Ga.

[*] Notice: The portion of the term of this patent subsequent to Sep. 10, 2008 has been disclaimed.

[21] Appl. No.: 621,525

[22] Filed: Nov. 30, 1990

Related U.S. Application Data

[63] Continuation-in-part of Ser. No. 288,681, Dec. 22, 1988, Pat. No. 5,047,375.

[51] Int. Cl.⁵ .................. C04B 33/00; C09C 1/36
[52] U.S. Cl. .................. 106/439; 106/442; 106/446; 501/145; 501/147
[58] Field of Search ............. 501/145, 147, 146, 150, 501/148; 106/439, 442, 446, 463, 464, 468

[56] References Cited

U.S. PATENT DOCUMENTS 3,450,257  6/1969  Cundy .
3,586,523  6/1971  Fanselow et al. .
3,627,678  12/1971 Marston et al. .
4,026,762  5/1977  Bauman .
4,028,173  6/1977  Olson .
4,098,688  7/1978  Nott .
4,381,948  5/1983  McConnell et al. .
4,518,491  5/1985  Bilimoria et al. .
4,678,517  7/1987  Dunaway .
5,047,375  9/1991  Dunaway et al. .................. 501/145

Primary Examiner—William R. Dixon, Jr.
Assistant Examiner—Paul Marcantoni
Attorney, Agent, or Firm—Klauber & Jackson

[57] ABSTRACT

A method of producing a high opacifying kaolin pigment by separating from one or more iron-stained titania-containing crude kaolins having a titania content of from about 1 to 2 weight percent, one or more titania-enriched kaolin fractions which contain the titania in an amount of above 2 weight percent; subjecting the fraction(s) to media grinding; dewatering and drying the media ground fraction(s); blending the fraction(s) with a fine particle size unground kaolin having a titania content less than 2%, in proportions to provide a calciner feed having at least 2% titania; and calcining the feed at a temperature in the range of 1500° to 2200° F.

18 Claims, 1 Drawing Sheet

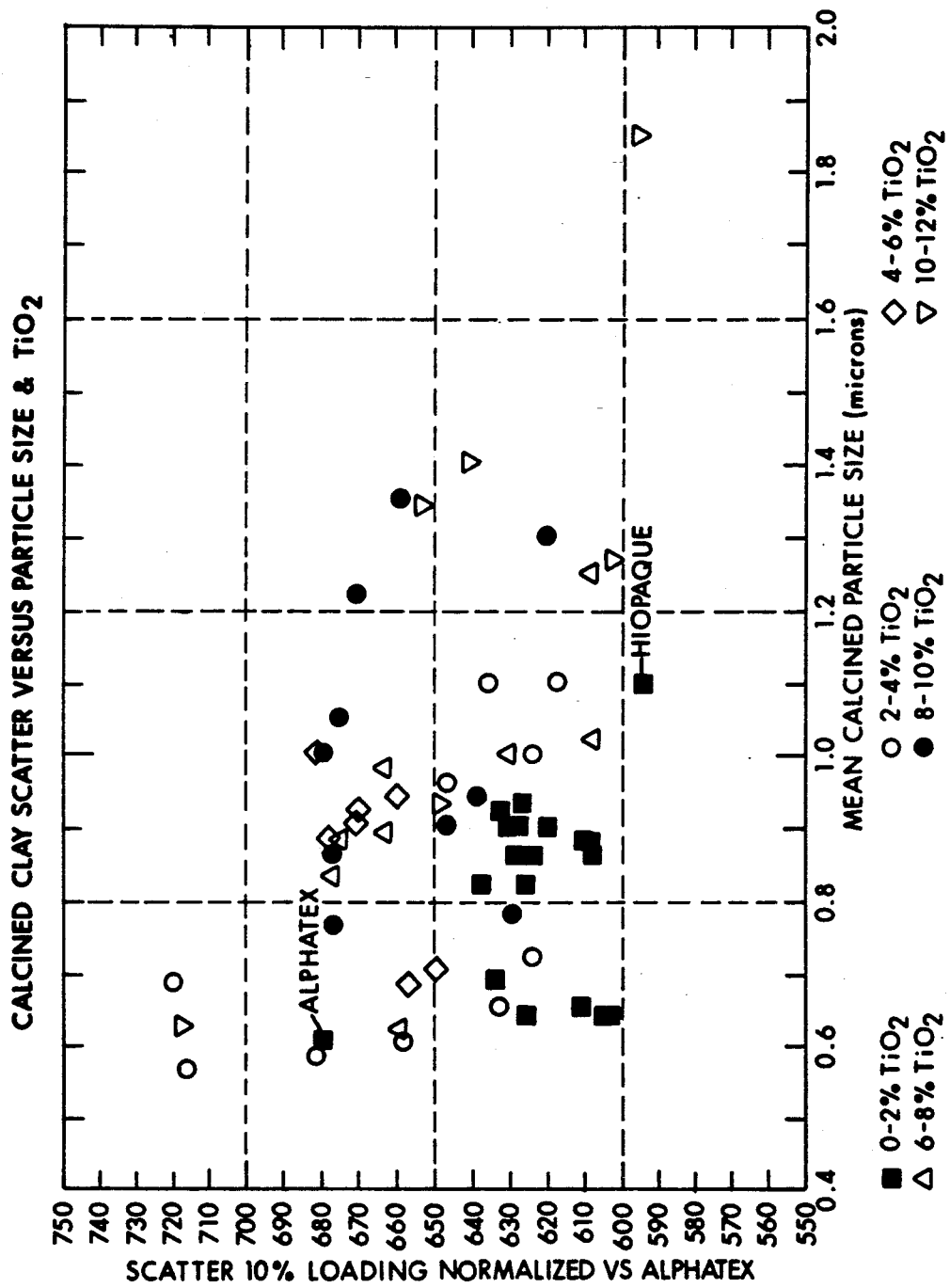

METHOD FOR PRODUCING HIGH OPACIFYING KAOLIN PIGMENT

This application is a continuation-in-part of copending application Ser. No. 288,681, now U.S. Pat. No. 5,047,375 filed Dec. 22, 1988.

BACKGROUND OF THE INVENTION

This invention relates generally to calcined clay products, more specifically, relates to a calcined kaolin clay pigment and method of manufacture of same. The pigment produced by the method of the invention has very high opacifying properties when incorporated as a filler in paper products.

In the course of manufacturing paper and similar products, it is well known to incorporate quantities of inorganic materials into the fibrous web in order to improve the quality of the resulting product. The use of appropriate such fillers vastly improves the opacity and printability of certain types of light weight papers such as newsprint. This aspect of use of calcined kaolin clay pigments is discussed in some detail, for example, in Fanselow and Jacobs, U.S. Pat. No. 3,586,523. Other aspects of the presently preferred commercial methods for manufacturing calcined kaolin pigments for use particularly as fillers in paper manufacture, are also set forth in the said Fanselow et al patent, as well as in additional United States patents such as McConnell et al, U.S. Pat. No. 4,381,948.

The Fanselow et al and McConnell et al patents are indeed representative of the methodology now widely employed in the kaolin industry in order to produce calcined kaolin clay pigments for use in paper manufacturing. Study of these patents will show that the objective of same, as is customary in the art, is to produce a fine particle size calcined kaolin clay pigment of relatively very high brightness, beginning with a crude kaolin which has a relatively very low brightness. Indeed, a preferred crude feed material for use in processes such as are disclosed in the Fanselow and McConnell patents, is a highly discolored, so-called "gray" kaolin, which is referred to in the Fanselow patent as a "hard sedimentary kaolin clay." Thus, the gray crude which is used in the example of Fanselow has an initial brightness of 78, where the figure cited refers to the so-called GE scale. Procedures for measuring brightness as set forth in this application, and as is generally recognized in the industry, are in accord with TAPPI procedure T646os75. As a result of the beneficiation treatment set forth in the Fanselow et al patent, these brightnesses are considerably increased indeed to a very high whiteness. Claim 2 of said Fanselow et al patent thus recites a GE brightness within the range of 92% to 95%. Similarly, the McConnell et al patent describes a resultant pigment having a brightness of at least 93 as being the final output product from practice of the beneficiation methods set forth therein. A calcined kaolin pigment substantially produced in accordance with the McConnell et al patent is available commercially from E.C.C. America Inc. of Atlanta, Ga., under the trademark ALPHATEX ®.

It is of particular interest pertinent to the present invention to observe that in the McConnell patent, it is emphasized that the crude used to produce the high brightness pigments preferably includes not more than 2% by weight of titanium expressed as $TiO_2$. A principal reason for this is that clay minerals occurring in nature, including kaolin clays, frequently contain their discoloring contaminants in the form of iron and/or titanium-based impurities. The quantities of the titaniferous impurities in sedimentary kaolins of Georgia are significant and are commonly present as iron oxide-stained titanium oxides. Irrespective of whether calcining is used, it has commonly been considered in the kaolin industry that it is paramount to refine the crude kaolins to bring the brightness characteristics of the resultant product to a level acceptable for various applications such as paper coating, or as mentioned, even for filling. Among the techniques which have been used in the past to remove the discoloring impurities, are the use of hydrosulfites for converting at least part of the iron-based impurities to soluble form, which may then be extracted from the clay. A further method which has come into increasing use in the kaolin industry involves the use of high intensity magnetic separation as described, for example, in such patents as Marston. U.S. Pat. No. 3,627,678. This method is also useful in removing titaniferous impurities in that although titania when pure has little magnetic attractability, the iron-stained titania which forms the basis (as mentioned) for the bulk of discolorants in many kaolins, may often be quite effectively removed by imposition of such a high intensity magnetic field.

One of the further, very effective methods for removing titaniferous impurities including iron oxide-stained titanium oxides, is the froth flotation technique. Generally according to this method, an aqueous suspension or slurry of the clay is formed, the pH of the slurry is raised to an alkaline value and a collector agent is added. The slurry is then conditioned by agitating for a short period. A frothing agent if necessary is added to the conditioned slurry, after which air is passed through the slurry in a froth flotation cell to effect separation of the impurities from the mineral.

Further details regarding the use of froth flotation techniques for removing titanium-based impurities from kaolins may be found at numerous places in the prior art, including for example U.S. Pat. Nos. 3,450,257 to E. K. Cundy, 4,518,491 to B. M. Bilimoria, and U.S. Pat. No. 4,098,688 to Alan Nott. In the procedures set forth in these patents, the iron-stained titania "contaminants" are separated with the froth. These separated materials, because of their very high titania content and high degree of discoloration, have in the past simply been termed "rejects," and as such discarded or used for some purpose unrelated to being pigments for paper manufacture. What therefore is to be especially appreciated, is that the discoloring iron-stained titania-based impurities removed from the crude kaolin by froth flotation (or even where such materials have been removed by magnetic separation), have heretofore been regarded as essentially useless material having little or no economic value for proper manufacture. The view in short, has in the past been that the object of beneficiation of kaolins was simply stated to remove these "contaminants" to thereby brighten the output product from which these contaminants had been removed.

Both the brightness characteristics of the given kaolin and the opacifying properties of same when incorporated as a filler in paper, may be quantitatively related to a property of the filler identified as the "scattering coefficient S". The said parameter, i.e., the scattering coefficient S of a given filler pigment, is a property well-known and extensively utilized in the paper technology art, and has been the subject of numerous technical papers and the like. The early exposition of such measurements was made by Kubelka and Munk, and is reported in Z. Tech Physik 12:539 (1931). Further citations to the applicable measurement techniques and detailed definitions of the said scattering coefficient are set forth at numerous places in the patent and technical literature. Reference may usefully be had in this connection, e.g. to U.S. Pat. Nos. 4,026,762 and 4,028,173. In addition to the citations set forth in these patents, reference may further be had to Pulp and Paper Science Technology, Vol. 2 "Paper", Chapter 3, by H. C. Schwalbe (McGraw-Hill Book Company, New York).

One of the long-recognized concerns that arises where a kaolin clay is subjected to calcination is the increase in abrasiveness, which can result from the formation of various abrasive phases during the calcination process. The presence of iron in the form e.g. of iron-stained titania, can promote the formation of these undesired phases, and thereby contribute to the unwanted abrasiveness in the calcined product. It is therefore a concern that any process which promotes the presence of high titania content in the calciner feed, could lead to a calcined product having undesirably high abrasion characteristics. Such abrasiveness is detrimental to the principal use of the pigments, since among other things, it effects rapid wear at portions of the paper making apparatus.

SUMMARY OF INVENTION

In accordance with the present invention, and contrary to prior experience and practice in the kaolin industry, it has unexpectedly been found that a pigment possessing highly useful properties, especially with respect to opacifying light weight paper such as newsprint, may be produced by calcining one or more high titania content kaolin fractions which are separated from a whole crude by size classification, froth flotation, magnetic separation or the like.

In one method of practising the present invention, there is separated from one or more iron-stained titania-containing crude kaolins having a titania content of from about 1 to 2 weight percent, one or more titania-enriched kaolin fractions, containing titania in the amount of above 2 weight percent. The one or more enriched kaolin fractions are subjected to wet particulate media grinding. The ground fraction or fractions are dewatered and dried, and then calcined at a temperature in the range of about 1500° to about 2200° F. The products yielded from calcination can then be pulverized to a desired screen size to yield the finished product.

The one or more separated kaolin fractions may include the reject portion from a froth flotation treatment of the iron-stained crude kaolin. Each of the fraction or fractions subjected to media grinding contains over 2% titania. If only a single fraction is used, its titania content will be up to about 3%. If multiple fractions are used, some may have as much as 8% titania; but the relative proportions of the several fractions is such that the total material subjected to the media grinding has a titania content of from 2 to 3%. Preferably the one or more fractions are thus sandground to provide a P.S.D. of sufficient fineness so that at least 90%<2 μm (by weight).

In a preferred procedure, the one or more media ground fractions are blended with a fine particle size unground kaolin prior to calcining. The unground kaolin can e.g. be the recovered product from a centrifuge separation incident to beneficiation of a kaolin crude, and has a titania content of less than 2%. The unground kaolin is already of reduced particle size (e.g. being the fine cut from centrifuging, such as 92%<2 μm), and as is known, will therefore be relatively free of elements which generate abrasive phases upon calcining. The proportion of the media ground fraction or fractions to the unground kaolin is such as to provide a kaolin calciner feed with above 2% to about 3% titania. The one or more fractions may comprise 30 to 50% of the blend, and the unground kaolin comprises the balance.

The use of the aforementioned media grinding step to reduce the particle size of the separated fraction or fractions is of considerable significance in the present invention, in that by virtue of the use of a titania-enriched fraction, the abrasion of the final calcined product can become unacceptably high. It has been found, however, that by reducing the particle size of the ground product to a range such that at least 85% (and preferably 90%) by weight are beneath 2 micrometers, the high titania content does not unduly affect the abrasion, while at the same time the opacifying properties of the pigment are substantially retained. The said grinding step is preferably accomplished by use of a media such as fine sand, silica, quartz or the like, and is beneficial regardless of the source of the fraction, i.e. whether same is obtained from an initial particle size classification, from froth flotation, magnetic separation, or by other separation techniques which enable recovery of the high titania fraction.

When a pigment produced in accordance with the present invention is utilized in the filling of paper, it imparts a sheet brightness in the range of about 60 to 90, but yields substantially higher opacifying properties than a prior art calcined kaolin not enriched in titania. The brightness of the high opacifying fully calcined pigment resulting from the invention is in the range of about 70 to 82. The Bruening abrasion is less than 42, and the titania content is greater than 2% by weight. The Bruening abrasion is preferably below 35, and may be in the range of 20-35. To be particularly noted is that brightness values as indicated have typically been considered undesirable for use as fillers; but in accordance with the present invention, these fillers have been found to produce very high opacifying properties, thereby vastly improving the use and printability of such thin, "low grade" papers such as newsprint.

BRIEF DESCRIPTION OF THE DRAWING

The Figure herein is a graph depicting scatter at 10% loading as a function of mean calcined particle size for a series of pigment samples, some of which are prepared in accordance with an aspect of the present invention, and others being controls.

DESCRIPTION OF THE PREFERRED EMBODIMENT

The practice of the present invention will now be illustrated by Examples, which are deemed illustrative of the invention and not delimitative thereof.

EXAMPLE I

In this Example, a series of samples, as set forth in Tables 1 and 2 below, were subjected to calcination in a laboratory muffle furnace for a period of 35 minutes at calcination temperatures as indicated in the same table to give fully calcined products. The samples identified as "froth" were obtained as the discards from a plant flotation process, which process was substantially in accord with the procedure set forth in the aforementioned U.S. Pat. No. 4,518,491. The froth yielded as overflow from the flotation process was subjected to dewatering and drying prior to being subjected to calcination at the schedule indicated. TiO₂ content for each sample was determined after calcination. The products yielded from the calcination treatment were pulverized to a particle size of 99% by weight finer than 325 mesh screen, and the final output product was first measured for brightness using TAPPI procedure T646os75 as previously indicated.

The pigment products yielded by this Example were subjected to tests to determine the pigment scattering coefficient and absorption of the pigment when same was used as a filler in paper at a 10% loading factor by weight. More specifically, the pigment was tested at 10% loading in Storafite (trademark of Nova Scotia Forest Industries) bleached sulphite pulp beaten to a CSF (Canadian Standard Freeness) of 300–350. Deionized water was used in the sheet formation, together with 20 lbs/ton alum, and Percol 292 (trademark of Allied Colloids) as a retention aid.

This 10% value was derived by nominally loading the material at 5, 10, and 15%, obtaining the sheet scatter for the three sets of sheets, fitting the points to a straight line by a least square analysis, and calculating the 10% level by the equation generated.

As a control, the aforementioned Alphatex ® product was used at 10% loading under otherwise identical conditions. Table 1 sets forth scatter levels achieved at 10% filler level for the samples. All scattering data are normalized by comparison to the scattering coefficient of samples of the aforementioned Alphatex ®. Ideally in a study of the present nature, the same batch of beaten pulp should be used throughout. As this is not practical, the method adopted was to fill one set of sheets in each series of tests using the same Alphatex ® from series to series. Statistically, the Alphatex ® filled samples at 10% filler had a scattering coefficient of 680 cm²/gram, and in each series in which Alphatex ® differed from 680, the scattering coefficients of the experimental samples were accordingly adjusted proportionally to the adjustments which the Alphatex ®-containing paper required to bring its value to 680 cm²/gram. This procedure, which was used in subsequent examples, is from time to time referred to in the specification as "normalizing" the scattering coefficients.

In the case of the data in Table 2, the filler level was varied in the manner indicated. The data in Table 1 all reflects a filling level of 10%. Opacity was determined by TAPPI procedure T519 om-86. The absorption coefficient is derived from the Kubelka and Munk analysis, op. cit.

TABLE 2

| Filler Loading Required to Give Equal Sheet Opacity | | | |
|---|---|---|---|
| Pigment | % Filler Loading | Sheet Brightness | Sheet Opacity @ 60 gsm |
| Alphatex | 3.0 | 85.4% | 78.1% |
| Froth (1975°) | 2.2 | 83.6 | 78.1 |
| Froth (1650°) | 2.0 | 81.3 | 78.1 |
| Hiopaque | 4.2 | 84.1 | 78.1 |

As is seen, the froth product was in the case of the first two samples used directly. Also, as controls two commercial calcined kaolin products were used and evaluated, namely Hiopaque which is a product of Engelhard Corporation and the aforementioned Alphatex ® product.

Table 2 is of particular interest in showing the percentage of filler that is required with the differing samples in order to produce the opacity level 78.1, which is held constant at the right-hand column. It is of great significance to note here that in order to thus achieve the same opacity as can be obtained with the product of the invention, it is necessary to typically use 50% more content of Alphatex ® which is, however, a much higher cost product. The brightness of the products of the present invention are seen to be relatively low, but this is not considered in any way a detriment for the application of the said products to the area where they find most value, namely in filling so-called low cost thin papers, such as newsprint. In these instances, it is especially the opacity which is of interest, and the products of this invention yield outstanding results in that respect as can be seen from the appended data.

EXAMPLE II

In the Figure herein, scatter at 10% loading has been plotted against mean calcined particle size for a series of samples, some of which are prepared as in the invention, and others being prior art controls (as identified in the graph). The showing illustrates that for any given particle size, scatter is much higher for the iron-stained titania enriched products of the invention.

The following Examples III, IV and V illustrate the advantages in the present invention of a media grinding step in order to produce superior abrasion properties in the calcined product.

EXAMPLE III

In this Example, a reject fraction (from centrifuge separation of a degritted feed kaolin) having a 2.9% titania content and characterized as 74% <2 μm, was blended as 30 parts per hundred with 70 parts per hundred (by weight) of a second fine size particle kaolin fraction yielded from a Bird centrifuge which was fed from a separate processing line. The Bird fraction had a titania content of from 1.7 to 1.8% and a particle size distribution such that (by weight) 92% <2 μm E.S.D.

TABLE 1

| Pigment Physical and Optical Properties | | | | | |
|---|---|---|---|---|---|
| Sample | TiO₂ Conc. | Calcination Temperature | Pigment Brightness | Normalized Scatter (10%) | Absorption Coefficient (100%) |
| Froth | 7.7% | 1975° F. | 88.0% | 676 cm²/g | 77.7 cm²/gram |
| Froth | 7.7 | 1650 | 72.6 | 660 | 183.3 |
| Hiopaque | 1.0 | NA | 87.0 | 594 | 34.4 |
| Alphatex | 1.4 | 1975 | 92.5 | 680 | 13.0 |

In one instance, the high titania first fraction was subjected to sand grinding utilizing a media of 10 to 12 mesh sand for a sufficient period to reduce the particle size from 74% below 2 μm to 86% of the particles below 2 μm, utilizing an energy input of approximately 50 hp-hr/ton of kaolin solids. In a second instance, the blend was utilized as a calciner feed without any media grinding. Each blend was subjected to calcining at a temperature of 1700° F. (sandground), and 1750° F. (non-sandground). The calcined products were subjected to pulverizing as in Example II. The two products were evaluated for abrasion, brightness and particle size distribution. Abrasion was the Bruening abrasion determined in accordance with the procedure described in Table II of U.S. Pat. No. 4,678,517. It may be seen in Table 3 that the abrasion of the calcined product where sand grinding was utilized has been very substantially reduced thereby producing a much more desirable product for use in paper filling applications.

TABLE 3

Comparison of Physical Properties of the 70/30 Blend With and Without Sandgrinding of the High Titania Fraction

|  | No Sandgrinding | Sandgrinding High Titania Fraction |
|---|---|---|
| Abrasion (Bruening) | 66 ± 7 | 40 ± 5 |
| Brightness (G.E.) | 80 ± 0.4 | 79.7 ± 0.4 |
| % by weight <2 μm | 87 ± 2 | 88 ± 1 |

With respect to the use of Bruening abrasion values in Table 3, it may be noted that the kaolin industry in recent years has used either Einleiner or Bruening abrasions as the acceptable standard for product comparison. The earlier Valley scale reported in patents such as U.S. Pat. No. 4,381,948, has been found unreliable and thus has been superceded. The Einleiner and Bruening scales cannot be directly correlated with the Valley scale, due to this imprecision in the Valley measurement system.

EXAMPLE IV

The two calcined products produced in Example III were evaluated as paper filling pigments. The pigments were utilized as 5, 10 and 15 parts per hundred (by weight) filler in 60 grams sheets made from sulphite pulp. Scatter and absorption (@10%) loading coefficients for the filled sheets are given in Table 4.

TABLE 4

|  | No Sandgrinding of High Titania Fraction | Sandground High Titania Fraction |
|---|---|---|
| Normalized Scatter | 601 cm$^2$/g | 635 cm$^2$/g |
| Absorption Coefficient (10%) | 86 cm$^2$/g | 81 cm$^2$/g |

There is an increase in scatter from 601 to 635 cm$^2$/g with the sandgrinding step, with no apparent change in absorption (@10%).

EXAMPLE V

A product was prepared from a blend (A) of (1) 30 parts per hundred by weight of a high titania (2.7%) reject kaolin material (in this instance obtained from a centrifuge separation) for which the particle size had been reduced from about 93%<5 μm to 100%<5 μm and 89%<2 μm, through media grinding with sand 10 to 12 mesh particles, utilizing an energy input of approximately 50 hp hr/ton of kaolin solids; with (2) 70 parts per hundred by weight of a fine particle size fraction from a Bird centrifuge which was fed from a separate processing line. The Bird fraction (2) had a 1.7 to 1.8% titania content and a particle size distribution such that 92% was below 2 μm. A second blend (B) was prepared from a mixture of 27 parts per hundred by weight of the high titania-containing reject material in blend A, 3 parts froth as described in Example I, having a titania content of 5.7%, and 70 parts by weight of the fine particle size fraction from a Bird centrifuge, as in Blend A. The high titania-containing components, i.e. the 27 plus 3 parts above mentioned, were sandground utilizing an energy input of 50 hp hr/ton of kaolin solids, to reduce the particle size distribution such that 90% by weight <2 μm. Each blend A and B was calcined at a temperature of 1700° F. The calcined material was subjected to pulverizing and other processing as in Example I. The two resulting products were evaluated for brightness, abrasion, TiO$_2$ content, P.S.D., and porosity (as measured by mercury porosimetry). The products from blends A and B were compared with a commercially available control product of similar TiO$_2$ content and brightness (Spectrafil ®, product of Engelhard Corp.) which gives comparable scatter in a 60 gram paper sheet produced using sulphite pulp. It can be seen from the data in Table 5 that the abrasion of the products of this invention are extremely low compared to the commercial control product, with similar brightness, TiO$_2$ content, particle size distribution and pore volume.

TABLE 5

|  | Blend A | Blend B | Commercial Control Product |
|---|---|---|---|
| Brightness G.E. | 80.9 | 79.9 | 80.7 |
| Abrasion (Bruening) | 35 | 31 | 88 |
| TiO$_2$ (% by weight) | 2.2 | 2.1 | 2.4 |
| P.S.D. | | | |
| 2 μm | 88 | 84 | 84 |
| 1 μm | 74 | 71 | 74 |
| ½ μm | 42 | 37 | 26 |
| Porosity cm$^3$/g | 1.1 | 0.97 | 1.06 |

While the present invention has been set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed and limited only by the scope and spirit of the claims now appended hereto.

What is claimed is:

1. A method of producing a high opacifying kaolin pigment, which comprises separating from one or more iron-stained titania-containing crude kaolins having a titania content of from about 1 to 2 weight percent, one or more titania-enriched kaolin fractions, containing said titania in the amount of above 2 weight percent; subjecting said one or more enriched kaolin fractions to media grinding; dewatering and drying said media ground one or more fractions; blending said one or more fractions with a fine particle size unground kaolin having a titania content less than 2%, in proportions to provide a calciner feed having at least 2% titania; and calcining said calciner feed at a temperature in the range of about 1500° to about 2200° F.

2. A method in accordance with claim 1, wherein said one or more separated kaolin fractions includes the reject portion of a froth flotation treatment of said iron-stained crude kaolin.

3. A method in accordance with claim 1, wherein each of the fraction or fractions subjected to media grinding contains from 2 to 8% titania.

4. A method in accordance with claim 3, in which the one or more fractions are sandground to provide a P.S.D. of sufficient fineness such that at least 90% by weight are <2 μm, the relative proportions of the fraction or fractions being such that the total material subjected to said grinding has a titania content of up to about 3.0% by weight.

5. A method in accordance with claim 3, in which the one or more fractions comprise 30 to 50% of the blended calciner feed, and the unground fraction comprises the balance; and the blended calciner feed has a titania content of up to 3% by weight.

6. A method of producing a high opacifying kaolin pigment, which comprises separating from an iron-stained titania-containing crude kaolin having a titania content of from about 1 to 2 weight percent, a titania-enriched kaolin fraction, containing said titania in the amount of above 2 weight percent; subjecting said titania-enriched fraction to wet media grinding to reduce the average particle size thereof; dewatering and drying said fraction; blending said media ground fraction with a fine particle size unground kaolin having a titania content less than 2%, to provide a calciner feed having at least 2% titania; and calcining said calciner feed at a temperature in the range of about 1500° to about 2200° F.

7. A method in accordance with claim 6, wherein said separated kaolin fraction is a coarse reject fraction from a particle size separation of said iron-stained crude kaolin.

8. A method in accordance with claim 7, wherein the fraction subjected to media grinding contains from 2 to 3% titania.

9. A method in accordance with claim 8, in which said fraction is sandground to provide a P.S.D. of at least 90%<2 μm.

10. A method in accordance with claim 9, in which the fraction comprises 30 to 50% of the blend, and the unground kaolin comprises the balance; and the blend has a titania content of from 2 to 3% by weight.

11. A method in accordance with claim 10, in which the unground kaolin comprises the finer than 90%<2 μm recovered fraction from a centrifuge separation of a kaolin feed.

12. A method of producing a high opacifying kaolin pigment, which comprises separating from one or more iron-stained titania-containing crude kaolins having a titania content of from about 1 to 2 weight percent, one or more titania-enriched kaolin fractions, containing said titania in the amount of above 2 weight percent; subjecting said one or more enriched kaolin fractions to media grinding; dewatering and drying said media ground one or more fractions; and calcining said one or more fractions at a temperature in the range of about 1500° to about 2200° F.

13. A method in accordance with claim 12, wherein said one or more separated kaolin fractions includes the reject portion of a froth flotation treatment of said iron-stained crude kaolin.

14. A method in accordance with claim 12, wherein each of the fraction or fractions subjected to media grinding contains from 2 to 8% titania; and the relative proportions of the fraction or fractions being such that the total material subjected to said grinding has a titania content of from 2 to 3%.

15. A method in accordance with claim 14, in which the one or more fractions are sandground to provide a P.S.D. of at least 90%<2 μm.

16. A method in accordance with claim 14, in which the one or more media ground fractions are blended with a fine particle size unground kaolin prior to calcining; said unground kaolin having a titania content of less than 2%; the proportion of said media ground fraction or fractions to said unground kaolin providing a kaolin calciner feed with above 2% to about 3% titania; and wherein said one or more fractions comprise 30 to 50% of the blend, and the unground kaolin comprises the balance.

17. A high opacifying pigment for use in paper filling and coating, comprising a fully calcined kaolin having a Bruening abrasion of less than 42, a titania content of greater than 2% and a G.E. brightness of less than 82.

18. A pigment in accordance with claim 17, having a Bruening abrasion of below 35.

* * * * *